United States Patent [19]

Watanabe

[11] Patent Number: 4,521,500
[45] Date of Patent: Jun. 4, 1985

[54] LEAK-PROOF ALKALINE CELL
[75] Inventor: Osamu Watanabe, Toyonaka, Japan
[73] Assignee: Hitachi Maxell Limited, Osaka, Japan
[21] Appl. No.: 446,038
[22] Filed: Dec. 1, 1982
[30] Foreign Application Priority Data Dec. 4, 1981 [JP]  Japan ................. 56-195990
Dec. 4, 1981 [JP]  Japan ................. 56-195992

[51] Int. Cl.³ ............................................. H01M 2/08
[52] U.S. Cl. ................................... 429/174; 429/185
[58] Field of Search ............................ 429/174, 185

[56] References Cited

U.S. PATENT DOCUMENTS 4,224,736  9/1980  Feldhake ............... 429/174 X
4,263,380  4/1981  Riedl ..................... 429/174 X
4,282,293  8/1981  Van Lier ................ 429/185

FOREIGN PATENT DOCUMENTS 1213904  4/1966  Fed. Rep. of Germany ...... 429/185
146222   1/1981  German Democratic Rep. ............................... 429/185
52-5970  2/1977  Japan ................................. 429/185
61637    5/1979  Japan ................................. 429/185
16344    2/1980  Japan ................................. 429/185
118269   9/1981  Japan ................................. 429/185

Primary Examiner—Brian E. Hearn
Assistant Examiner—Stephen J. Kalafut
Attorney, Agent, or Firm—Birch, Stewart, Kolasch and Birch

[57] ABSTRACT

An improved leak-proof alkaline cell comprising positive and negative electrode materials, a member for accommodating said positive electrode materials, a member for covering said negative electrode materials and a gasket provided between the members, characterized in that a sealant comprising asphalt and a compound selected from the group consisting of homopolymer of vinyl acetate, copolymer of vinyl acetate and polyterpene is interposed between the gasket and at least one of said members.

5 Claims, 2 Drawing Figures

LEAK-PROOF ALKALINE CELL

The present invention relates to an improvement of alkaline cell which contains an alkaline electrolyte, more particularly, an improvement in leak-prevention of alkaline cell such as alkaline manganese cell, silver oxide cell, mercury cell, nickel cell or alkaline air cell.

In general, flow-out of an electrolyte from a cell is prevented by providing a gasket made of a synthetic resin such as polyethylene, polypropylene or polyamide, or a rubber at the opening end of a positive electrode can, a member for accommodating positive electrode materials, pressing the gasket inwardly to a negative electrode collector such as a negative electrode lead body or a negative electrode terminal plate, a member for covering negative electrode materials, so as to attain tight contact of surfaces of the positive electrode can and the gasket or the gasket and negative electrode collector facing each other.

In case of an alkaline cell wherein alkaline electrolyte such as potassium hydroxide or sodium hydroxide is used, however, the above closure manner tends to allow the leakage of electrolyte because of, for example, creeping-up phenomenon of the electrolyte along the copper surface of the negative electrode collector, and therefore, is not sufficient to prevent the leakage of the electrolyte. In order to assure the leakage prevention, there have been various proposals including formation of a negative electrode terminal plate in an appropriate shape and application of a sealant to the contact surfaces between the positive electrode can and gasket and/or between the gasket and the negative electrode collector. However, these proposals are not satisfactory in assuring a high leak-proof property.

It has now been found, as the result of an extensive study for the purpose of making a sufficient leak-proof property by improving the sealant to be applied to said contact surfaces, that the admixing of a homopolymer or a copolymer of vinyl acetate or polyterpene to asphalt, the conventional sealant, produces a higher leak-proof property than that of simple asphalt.

According to the present invention, the admixing of the homopolymer or copolymer of vinyl acetate or polyterpene to asphalt can be effected, for example, by dissolving the compound to be admixed and asphalt in a suitable solvent such as toluene, and then evaporating the solvent.

The copolymer of vinyl acetate may include ethylene-vinyl acetate copolymer, acrylic ester-vinyl acetate copolymer, vinyl chloride-vinyl acetate copolymer, vinyl ether-vinyl acetate copolymer and vinyl ester-vinyl acetate copolymer. The most preferable one is ethylene-vinyl acetate copolymer in view of elasticity and adhesiveness to the copper surface of the negative electrode collector.

Suitable amount of homopolymer or copolymer of vinyl acetate is 0.5 to 25% by weight, preferably 0.5 to 10% by weight, of asphalt.

Polyterpene may be used suitably as a solution, for example, of about 30% by weight in an organic solvent. Suitable amount of polyterpene is 1 to 30% by weight, preferably 3 to 15% by weight, of asphalt.

Asphalt may either be a blown asphalt or a straight asphalt, the latter of which is more preferable in view of its adhesiveness to the copper surface of the negative electrode collector. The most preferable is a straight asphalt having a softening point not less than 60° C. as measured by the ring and ball method (according to JIS (Japanese Industrial Standard) K2530), and penetration of 0.5 to 2.5 mm (25° C., 100 g, 50 sec.).

The gasket may be made of a polyolefin resin such as polyethylene, polypropylene, etc. or polyamide resin such as Nylon 11, Nylon 12, Nylon 6, Nylon 66, Nylon 610, etc., and preferably of polyamides such as Nylon 11 and Nylon 66.

For a better understanding of the present invention, a detailed description will be given below with reference to the accompanying drawings, in which.

Figure 1:
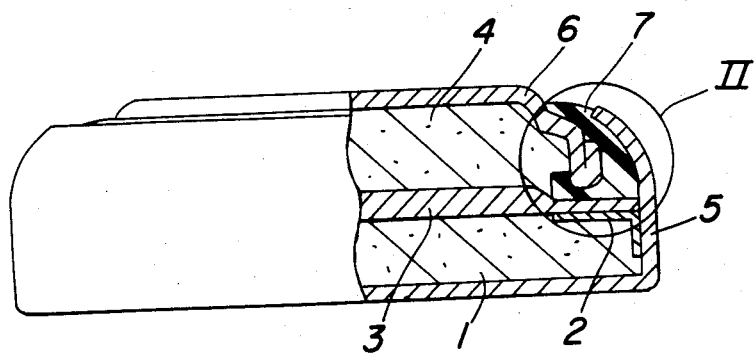
FIG. 1 is a front view with a partial section of a button type alkaline cell as an embodiment of the invention.
Figure 2:
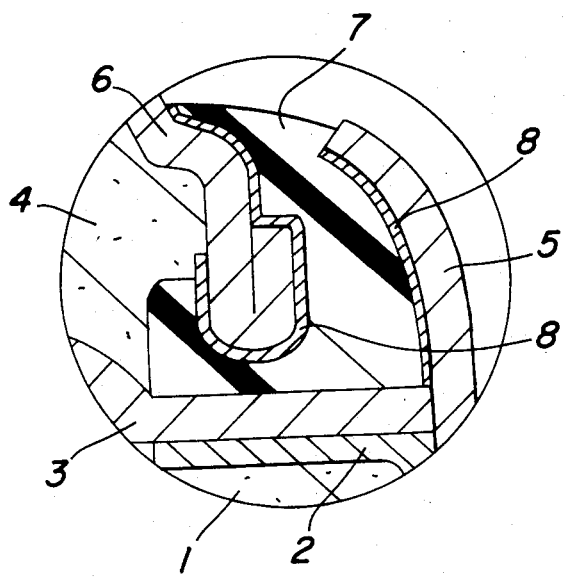
FIG. 2 is an enlarged view of the cell at the part II in FIG. 1.

In FIGS. 1 and 2, 1 denotes a positive electrode material mix comprising, for example, silver(I) oxide as a main ingredient; 2 denotes an annular metallic pedestal fixed on the circumferential finge of the positive electrode material mix 1 simultaneously with the pressure molding of the positive electrode material mix; 3 denotes a separator comprising a microporous polypropylene film imparted a hydrophilic property, a cellophane film and a vinylon-rayon mixed paper, which is brought into contact with the positive electrode material mix 1 and the annular pedestal 2; 4 denotes a negative electrode material mix comprising amalgamated zinc as an active material; 5 denotes a positive electrode can made of nickel-plated iron, into which the positive electrode material mix 1 and the separator 3 are accommodated; 6 denotes a negative electrode terminal plate, as the negative electrode collector, made of a clad plate consisting of a nickel layer, stainless steel plate and a copper layer and formed in a shape having the peripheral turn-up part by draw forming; 7 denotes an annular gasket, made of an elastic material such as polyamide (e.g. Nylon 11) and placed at the turn-up part of the negative electrode terminal plate 6. The gasket 7 is brought in full contact with both of the positive electrode can 5 and the negative electrode terminal plate 6 through inward constriction of fringe of the positive electrode can 5 to close tightly the content of the cell.

In FIG. 2, a sealant 8 comprising asphalt and a homopolymer or copolymer of vinyl acetate, or polyperpene is applied to the contacting surfaces between the negative electrode terminal plate 6 and the gasket 7 and between the gasket 7 and the positive electrode can 5. The electrolyte is a 35% potassium hydroxide aqueous solution containing zinc oxide.

The invention will now be further illustrated by means of the following Examples, which are conducted using a button type cell having a diameter of 7.9 mm and a height of 3.6 mm. Part(s) and % are by weight, unless otherwise indicated.

EXAMPLE 1

Each 46 g of straight asphalt containing ethylene-vinyl acetate copolymer in concentrations of 1, 5, 10 and 20% was dissolved in 1 liter of toluene to give a sealant solution. Fifty annular gaskets 7 made of Nylon 11 were dipped in the sealant solution and dried to form a film comprising a mixture of asphalt and polyvinyl acetate on each of the gaskets. Separately, each 289 g of straight asphalt containing polyvinyl acetate in the same concentrations as mentioned above was dissolved in 1 liter of toluene to give a sealant solution, which was coated on peripheral surfaces of fifty negative electrode terminal plates 6 to be contacted with the gaskets, and dried to form a film comprising a mixture of asphalt and polyvinyl acetate on each of the surfaces. Fifty cells were assembled using the gaskets and negative electrode terminal plates for each of the concentrations and represented by the symbols A (1%), B (5%), C (10%) and D (20%), respectively.

The cells were stored at 45° C. in an atmosphere having relative humidity of 90%. Leakage of electrolyte in the cells was inspected by dropping a solution of 0.1 part cresol red (indicator) in 80 parts of water and 20 parts of ethanol onto the outer surface of the gasket constituting the cell to detect the alkaline electrolyte. The leakage was recognized by red coloring of the dropped solution. The results are shown in Table 1.

EXAMPLE 2

Example 1 was substantially repeated except that ethylene-vinyl acetate copolymer was used in place of polyvinyl acetate and the gasket was made of Nylon 66. The cells were represented by the symbols E (1%), F (5%), G (10%) and H (20%), respectively. The results are shown in Table 1.

EXAMPLE 3

Example 1 was substantially repeated except that polyterpene was used in place of polyvinyl acetate. The cells were represented by the symbols I (1%), J (5%), K (10%) and L (20%), respectively. The results are shown in Table 1.

COMPARATIVE EXAMPLE 1

Example 1 was substantially repeated except that polyvinyl acetate was not used. The cell was represented by the symbol M. The results are shown in Table 1.

TABLE 1

| Example No. | Material of gasket | Symbol of cell | Additive for asphalt* | | Number of leaked cells in storage | | |
|---|---|---|---|---|---|---|---|
| | | | | | 60 day | 90 days | 120 days |
| 1 | Nylon 11 | A | PVAc | 1% | 0 | 4 | 10 |
| | | B | | 5% | 0 | 0 | 1 |
| | | C | | 10% | 0 | 1 | 5 |
| | | D | | 20% | 1 | 5 | 12 |
| 2 | Nylon 66 | E | EVA | 1% | 0 | 0 | 0 |
| | | F | | 5% | 0 | 0 | 0 |
| | | G | | 10% | 0 | 0 | 0 |
| | | H | | 20% | 0 | 1 | 5 |
| 3 | Nylon 11 | I | PTp | 1% | 1 | 5 | 12 |
| | | J | | 5% | 0 | 2 | 8 |
| | | K | | 10% | 0 | 3 | 10 |
| | | L | | 20% | 1 | 5 | 12 |
| Comparative 1 | Nylon 11 | M | — | | 1 | 6 | 14 |

Note:
*PVAc: Polyvinyl acetate; EVA: ethylene-vinyl acetate copolymer; PTp: polyterpene.

It can be clearly seen from above results that the numbers of leaked cells in Examples 1 to 3 wherein the sealant contained polyvinyl acetate, ethylene-vinyl acetate copolymer or polyterpene in addition to asphalt were significantly less than those in Comparative Example 1 wherein the sealant consisted only of asphalt.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A leak-proof alkaline cell comprising positive and negative electrode materials, a member for accommodating said positive electrode materials, a member for covering said negative electrode materials and a gasket made of a polyamide provided between the members, characterized in that a sealant comprising asphalt and a ethylene-vinyl acetate copolymer in an amount of 0.5 to 25% by weight of said asphalt is interposed between said gasket and at least one of said members.

2. The cell according to claim 1, wherein the sealant is interposed between the gasket and the member covering the negative electrode materials.

3. The cell according to claim 1, wherein the asphalt is a straight asphalt.

4. The cell according to claim 3, wherein the straight asphalt has a softening point not less than 60° C.

5. The cell according to claim 1, wherein the amount of copolymer of ethylene-vinyl acetate is 0.5 to 10% by weight of asphalt.

* * * * *